United States Patent
Lin et al.

(10) Patent No.: US 10,182,224 B2
(45) Date of Patent: Jan. 15, 2019

(54) METHOD FOR CREATING 3D IMAGE

(71) Applicant: Theia Limited, Hsinchu County (TW)

(72) Inventors: Yu-Hsuan Lin, Hsinchu County (TW); Tang-Hung Po, Hsinchu County (TW)

(*) Notice: Subject to any disclaimer, the term of this patent is extended or adjusted under 35 U.S.C. 154(b) by 207 days.

(21) Appl. No.: 15/252,240

(22) Filed: Aug. 31, 2016

(65) Prior Publication Data
US 2017/0064285 A1    Mar. 2, 2017

Related U.S. Application Data (60) Provisional application No. 62/211,897, filed on Aug. 31, 2015.

(51) Int. Cl.
*H04N 13/305*    (2018.01)
*H04N 13/398*    (2018.01)
*H04N 13/229*    (2018.01)

(52) U.S. Cl.
CPC ......... *H04N 13/229* (2018.05); *H04N 13/305* (2018.05); *H04N 13/398* (2018.05)

(58) Field of Classification Search
CPC .. H04N 19/132; H04N 19/156; H04N 19/172; H04L 65/607
See application file for complete search history.

(56) References Cited

U.S. PATENT DOCUMENTS

| | | | | |
|---|---|---|---|---|
| 9,188,823 B2* | 11/2015 | Niioka | ............... | G02B 27/2214 |
| 9,217,872 B2* | 12/2015 | Niioka | ............... | G02B 27/22 |
| 9,282,322 B2* | 3/2016 | Aoki | ............... | H04N 13/305 |
| 2009/0096726 A1* | 4/2009 | Uehara | ............... | G02B 27/2214 345/84 |
| 2013/0217161 A1* | 8/2013 | Hsu | ............... | H01L 25/0753 438/29 |
| 2013/0222558 A1* | 8/2013 | Yamada | ............... | H04N 13/305 348/59 |

* cited by examiner

*Primary Examiner* — Tsion B Owens (57) ABSTRACT

A method for creating 3D image is provided. First, capture device, subject to be captured, and lenticular array are provided. Lenticular array comprises strip-shaped lenticular lenses, subject is disposed between capture device and lenticular array, length of a bottom of each lenticular lens is 2L, and center of the bottom is set as 0. Lens of the capture device is aimed at a top of one of lenticular lenses and −xL of bottom coordinate of lenticular lens, and the value of x is smaller than 1 but greater than 0. Capture device is turned with top of lenticular lens as center to capture the subject until lens of capture device is aimed at xL of bottom coordinate of lenticular lens. Pixel from −L to −xL and from L to xL of bottom coordinate is mapped with pixel from −xL to 0 and from xL to 0 captured by capture device.

15 Claims, 12 Drawing Sheets

METHOD FOR CREATING 3D IMAGE

BACKGROUND OF THE INVENTION

Field of Invention

The present invention relates to a method for creating image, especially relates to a method for creating 3D image.

Description of Related Art

Figure 1:
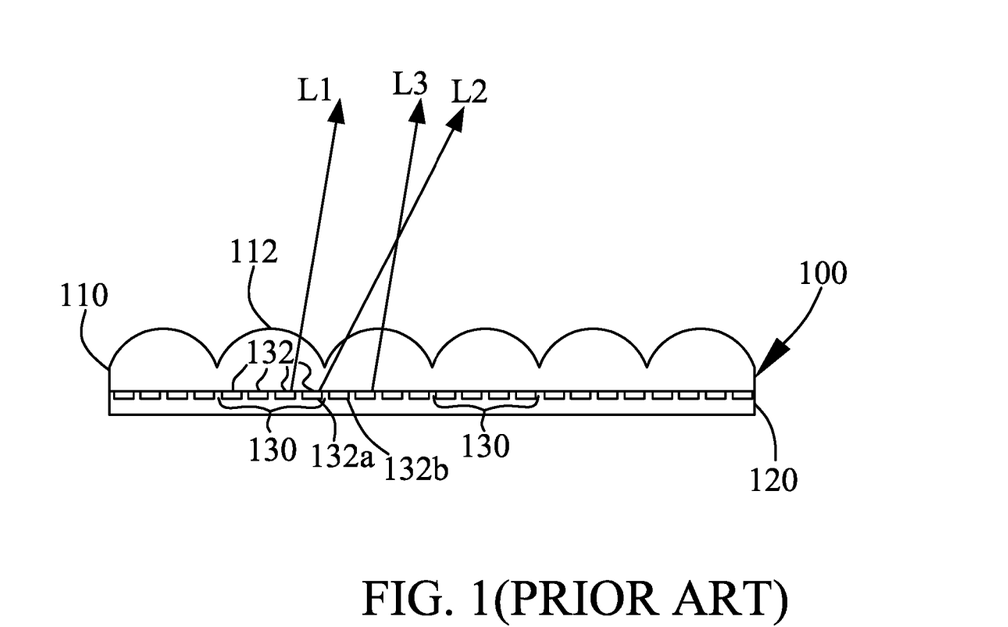
FIG. 1 illustrates a conventional 3D image system.

Autostereoscopic display device is for a user to view 3D images without wearing glasses. A lenticular array is one of the devices to achieve 3D images. Referring to FIG. 1, FIG. 1 illustrates a conventional 3D image system 100. The 3D image system 100 includes a lenticular array 110 and a recorded imaged media 120. The lenticular array 110 includes a plurality of lenticular lenses 112. The recorded imaged media 120 is provided with multiple image line sets 130 thereon. Each image line set 130 is composed of multiple image lines 132. Each image line set 130 corresponds to a respective lenticular lens 112.

As shown in FIG. 1, in a preferred circumstance, when the user 17 takes a view, if the light (such as the light L1) emitted from the image line 132 of each image line set 130 is emitted out from its corresponding lenticular lens 12 only, there will be no afterimages. However, when the user changes his/her angle to take a view, the light (such as the light L2) emitted from the image line 132a located at the edge of the lenticular lens 112 will be emitted out from its adjacent lenticular lens 12 to overlap the light (such as the light L3) emitted from the image line 132b of the adjacent lenticular lens 112. Because the image line 132a is not similar to the image line 132b, there will be afterimages when the user 17 takes a view.

Therefore, how to decrease afterimages when the user 17 takes a view is worthy to overcome this problem for the person skilled in this field.

SUMMARY OF THE INVENTION

One aspect of the invention is to provide a method and system for creating 3D image. The method for creating 3D image meets the demand for decreasing afterimages.

To achieve the foregoing and other aspects, a method for creating 3D image is provided. The method includes steps as following:

(a) providing a capture device, a subject to be captured, and a lenticular array, wherein the lenticular array comprises a plurality of strip-shaped lenticular lenses, the subject to be captured is disposed between the capture device and the lenticular array, a length of a bottom of each lenticular lens is 2 L, and a center of the bottom is set as 0;

(b) placing the capture device to aim at a top of one of the lenticular lenses and a point between −xL to xL of a bottom coordinate of the lenticular lens, and capturing the subject until a capturing for a plurality of pixels corresponding to the range from −xL to xL of the bottom coordinate of the lenticular lens is finished, wherein the value of x is smaller than 1 but greater than 0;

(c) mapping pixels corresponding to the range from from −xL to 0 and from xL to 0 captured by the capture device to pixels corresponding to a range from −L to −xL and from L to xL of the bottom coordinate; and (d) repeating the steps (b) to (c) for the others of the lenticular lenses.

In addition, another method for creating 3D image is also provided. The method includes steps as following:

(a) providing a capture device, a subject to be captured, and a lenticular array, wherein the lenticular array comprises a plurality of strip-shaped lenticular lenses, the subject to be captured is disposed between the capture device and the lenticular array, a length of a bottom of each lenticular lens is 2 L, and a center of the bottom is set as 0;

(b) placing the capture device to aim at a top of one of the lenticular lenses and a point between −xL and xL of a bottom coordinate of the lenticular lens, and capturing the subject until a capturing for a plurality of pixels corresponding to the range from −xL to xL of the bottom coordinate of the lenticular lens is finished, wherein the value of x is smaller than 1 but greater than 0;

(c) capturing all pixels corresponding to a range from −L to −xL and from L to xL of the bottom coordinate, during the capturing the capture device is not aimed at the top of the lenticular lenses;

(d) repeating the steps (b) to (c) for the others of the lenticular lenses.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF THE INVENTION

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

Figure 2:
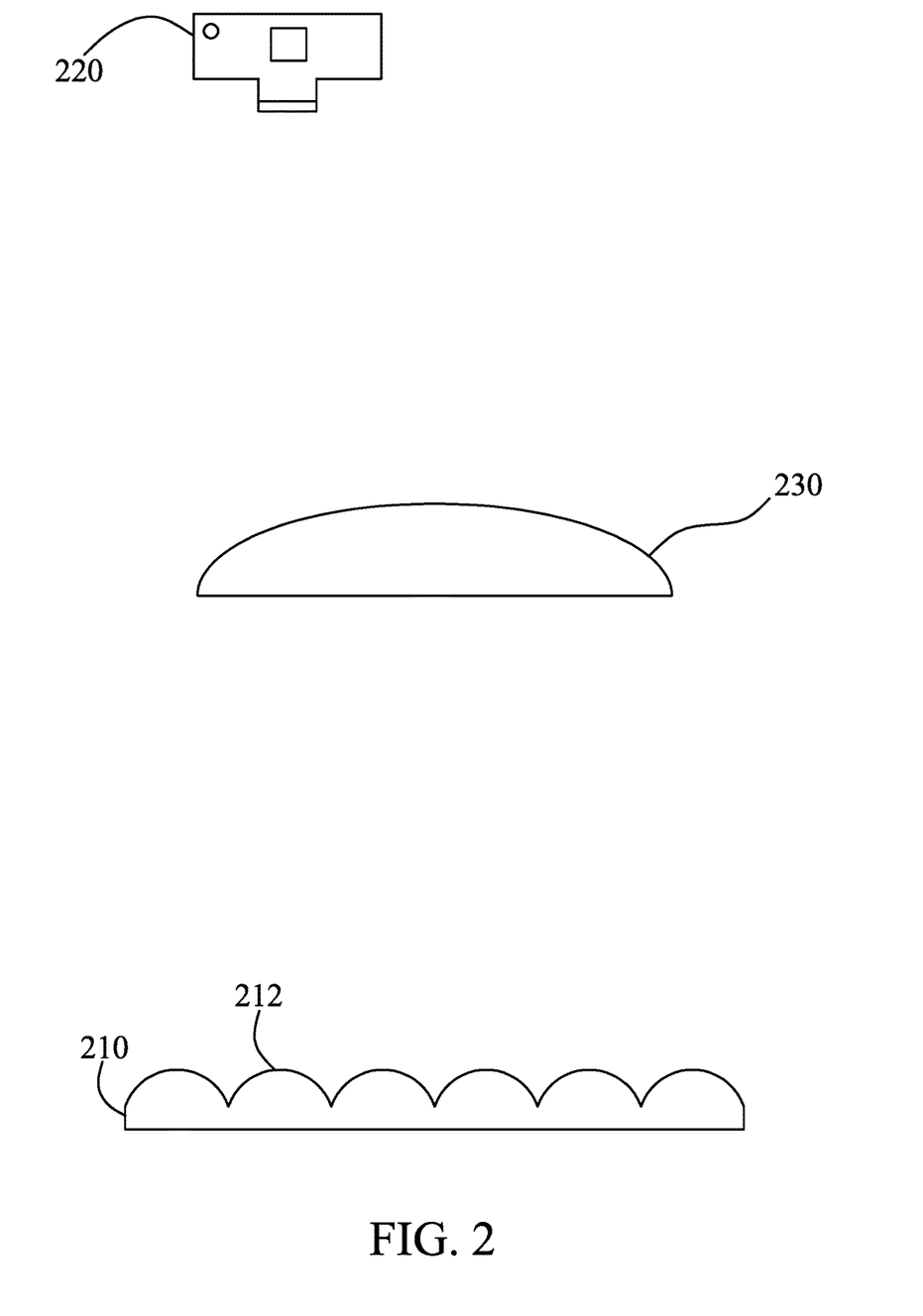
FIG. 2 illustrates an image capture system in accordance with an embodiment of the present invention.

Referring to FIG. 2, FIG. 2 illustrates an image capture system in accordance with an embodiment of the present invention. The image capture system 200 is used to create 3D images. The image capture system 200 includes a capture device 220 and a lenticular array 210. The lenticular array 210 includes a plurality of strip-shaped lenticular lenses 212. A subject 30 to be captured is disposed between the capture device 220 and the lenticular array 210. The subject 30 to be captured may be a 3D model or a human face. However, the subject 30 can be selectively placed below the lenticular array 210. In other words, the lenticular array 210 can be selectively placed between the capture device 220 and the subject 30.

Figure 3A:
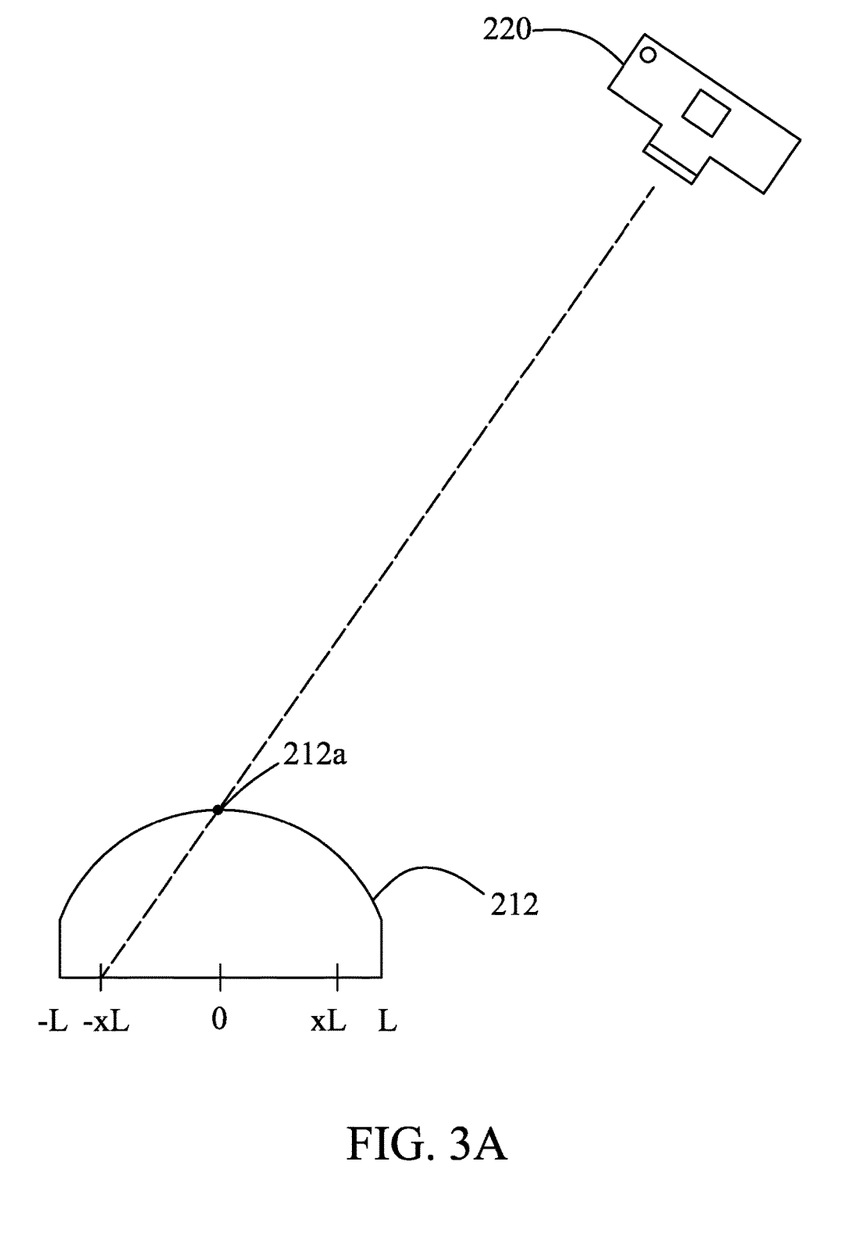
FIG. 3A and FIG. 3B are schematic views illustrating the capture device, the lenticular lens and the subject to be captured in the operation in accordance with an embodiment of the present invention.
Figure 3B:
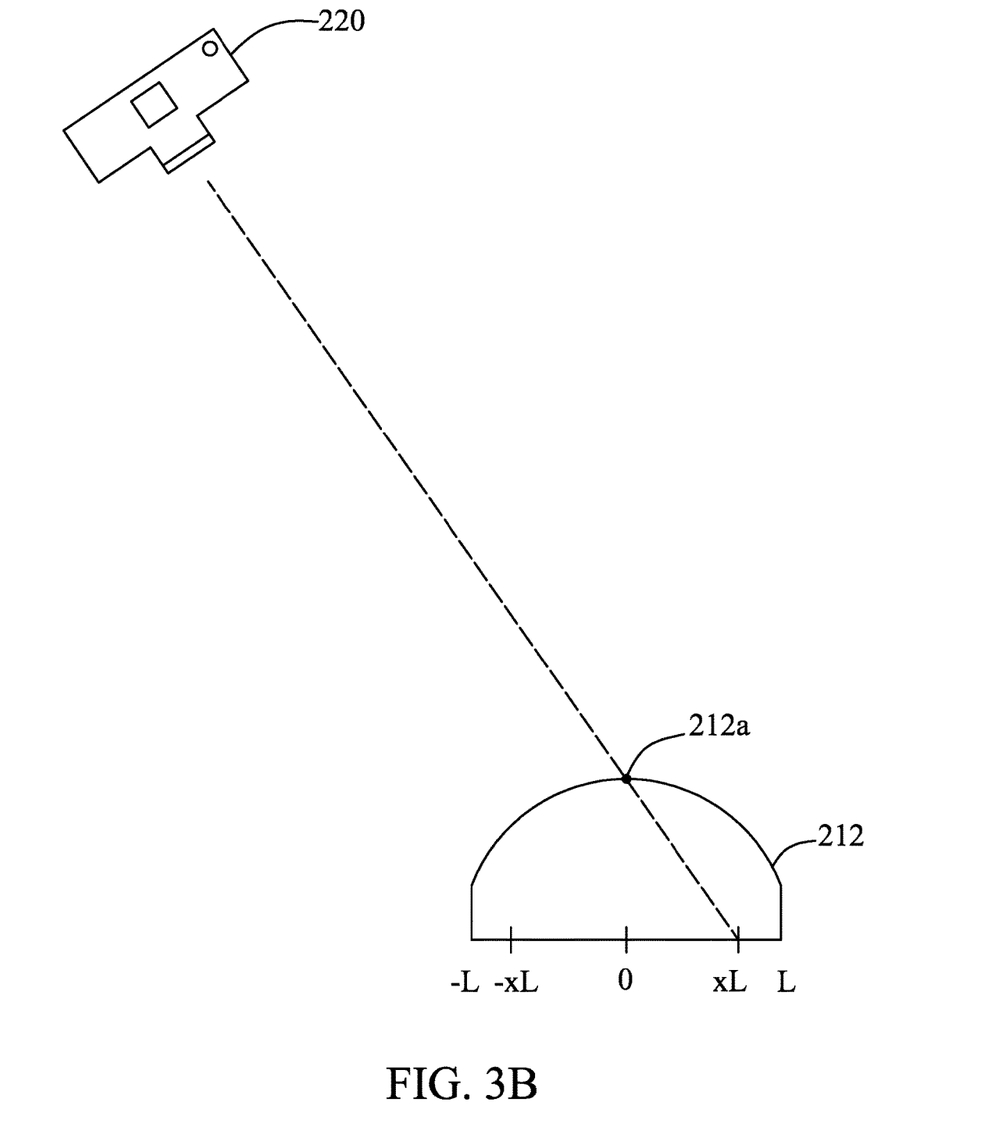

The method for creating a 3D image is described hereinafter. In order to understand the features of the present invention more plainly, FIG. 3A and FIG. 3B illustrate only one lenticular lens 212 and the subject 30 to be captured is not shown in FIG. 3A and FIG. 3B. However, the person skilled in this field can know that when the capture device 220 is used to capture, the subject 30 is to be captured.

Figure 4:
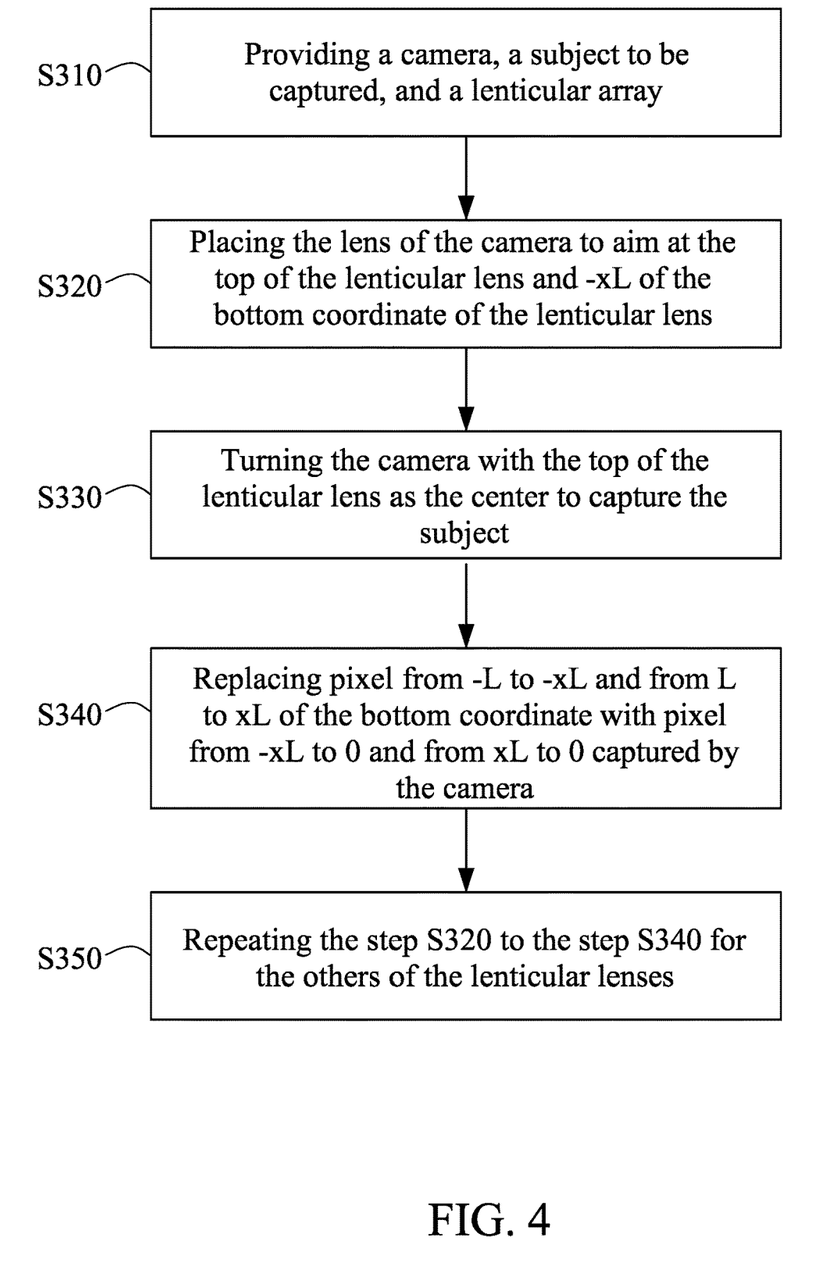
FIG. 4 is a flowchart illustrating a method for creating 3D image according to one embodiment of the present invention.

First, referring to FIG. 4, performing Step S310, providing a capture device 220, a subject 30 to be captured, and a lenticular array 210 as shown in FIG. 2. Next, referring to FIG. 3A and FIG. 4, performing Step S320, the lens of the capture device 220 is aimed at the top of the lenticular lens 212 and −xL of the bottom coordinate of the lenticular lens 212. That is to say, the lens of the capture device 220, the top of the lenticular lens 212 and −xL of the bottom coordinate of the lenticular lens 212 are in alignment (as denoted by the dashed line in the drawing). As shown in FIG. 3A, the length of the bottom of the lenticular lens 212 is 2 L. In this embodiment, the center of the bottom coordinate is set as 0, the leftmost end is set as −L, and the rightmost end is set as L. The person skilled in this field can know that the leftmost end may be set as L, and the rightmost end may be set as −L. Preferably, the value of x is greater than 0.5. In this embodiment, the value of x is 0.75.

Next, performing Step S330, the capture device 220 is turned counterclockwise with the top of the lenticular lens 212 as the center to capture the subject 30 (as shown in FIG. 2) until the lens of the capture device 220 is aimed at xL of the bottom coordinate of the lenticular lens 212 as shown in FIG. 3B. Furthermore, the capturing procedure of the capture device 220 is not limited in the procedure as described in the step S320~step S330, i.e. taking place from −xL to xL sequentially, just to capture the subject 30 until a capturing for a plurality of pixels corresponding to the range from −xL to xL of the bottom coordinate of the lenticular lens 212 is finished. In the embodiment, the pixel is a long-strip form and a length thereof is as long as the lenticular lens 212.

Next, performing Step S340, using a mapping function the pixels corresponding to the range from −L to −xL and from L to xL of the bottom coordinate are mapped with the pixels corresponding to the range from −xL to 0 and from xL to 0 captured by the capture device 220. In particular, when the capture device 220 completes the action of capturing from −xL to xL, it won't capture the range from −L to −xL and from L to xL. On the contrary, it adopts soft simulation. The pixels corresponding to the range from −xL to 0 and from 0 to xL captured by the capture device 220 are copied in proportion to the range from −L to −xL and from L to xL. For example, if x is 0.75, the pixels corresponding to the range from 0 to 0.75 L captured by the capture device 220 is compressed in the ratio 3:1 and copied to the pixels corresponding to the range from 0.75 L to L. Similarly, the pixels corresponding to the range from 0 to −0.75 L captured by the capture device 220 is copied to the pixels corresponding to the range from −0.75 L to −L. Besides, it is noted that Step S330 and Step S340 can be performed simultaneously. That is, when the capture device 220 captures, the software performs simulation simultaneously.

Afterward, performing Step S350, the capture device 220 is displaced, enabling the lens of the capture device 220 to aim at the top of another lenticular lens, and Steps S320 to S340 are repeated until all the lenticular lenses 212 on the lenticular array 210 (as shown in FIG. 1) has been captured.

Figure 6A:
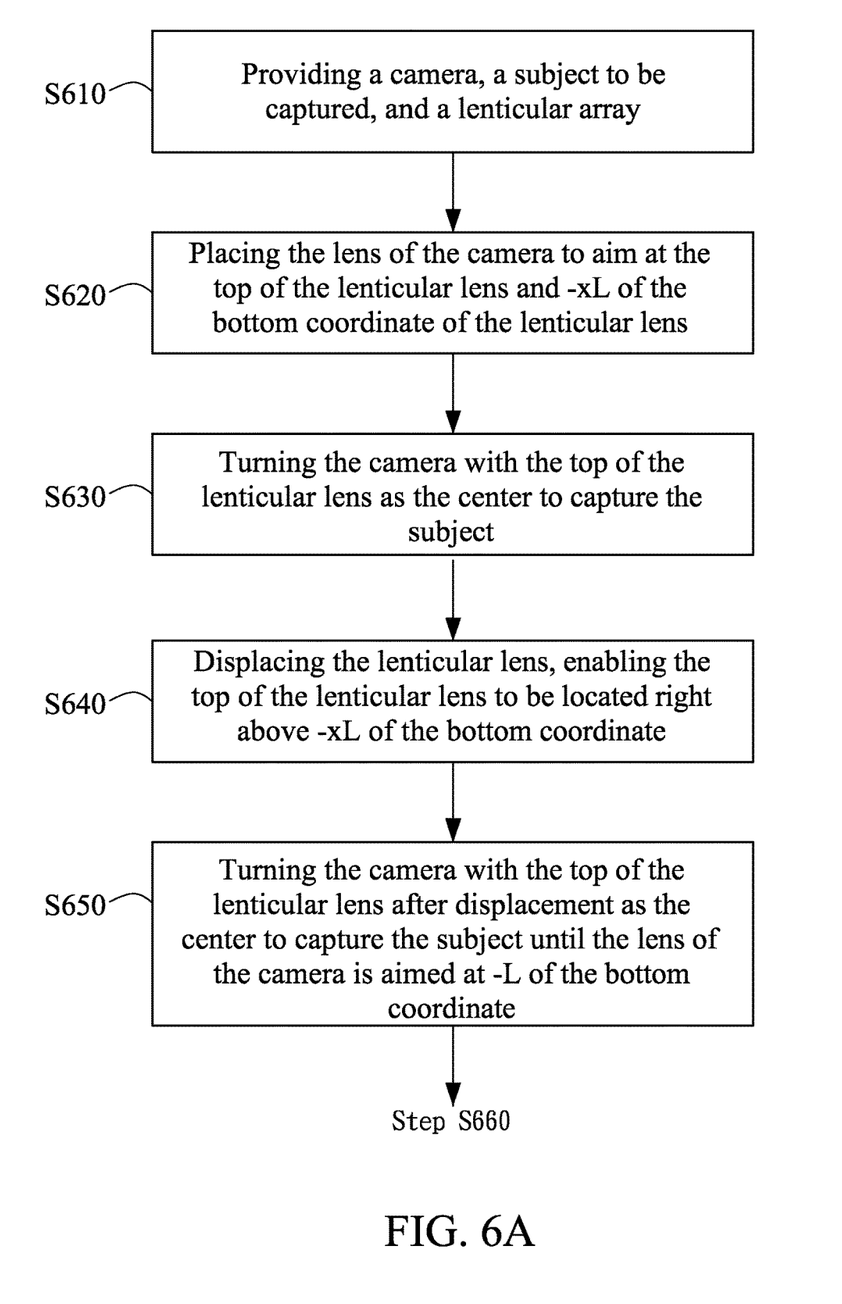
FIG. 6A and FIG. 6B are a flowchart illustrating a method for creating 3D image according to another embodiment of the present invention.

Another method for creating a 3D image is described hereinafter. This method is substantially similar to the aforesaid method with the exceptions described hereinafter. Unless otherwise noted, like reference numerals denote like elements throughout the attached drawings and the written description, and thus, descriptions thereof will not be repeated. First, referring to FIG. 6A and FIG. 2, performing Step S610, providing a capture device 220, a subject 30 to be captured, and a lenticular array 210 as shown in FIG. 2. As in the first embodiment, the subject 30 can be selectively placed below or above the lenticular array 210. Next, referring to FIG. 3A and FIG. 6A, performing Step S620, the lens of the capture device 220 is aimed at the top 212a of the lenticular lens 212 and −xL of the bottom coordinate of the lenticular lens 212. Next, performing Step S630, the capture device 220 is turned counterclockwise with the top of the lenticular lens 212 as the center to capture the subject 30 (as shown in FIG. 2) until the lens of the capture device 220 is aimed at xL of the bottom coordinate of the lenticular lens 212 as shown in FIG. 3B. As in the first embodiment, the capturing procedure of the capture device 220 is not limited in the procedure as described in the step S320~step S330, i.e. taken place from −xL to xL sequentially, just to capture the subject 30 until a capturing for a plurality of pixels corresponding to the range from −xL to xL of the bottom coordinate of the lenticular lens 212 is finished. In the embodiment, the pixel is a long-strip form and a length thereof is as long as the lenticular lens 212.

Figure 6B:
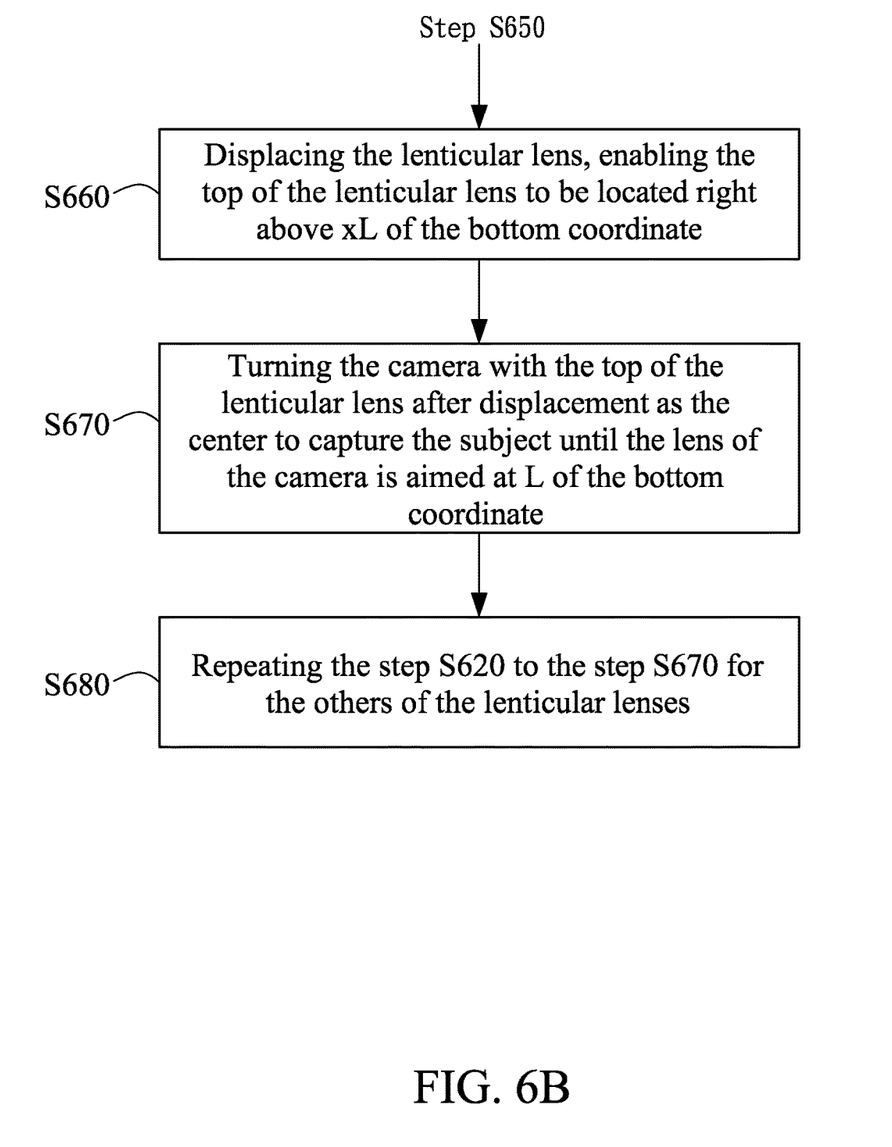
Figure 7A:
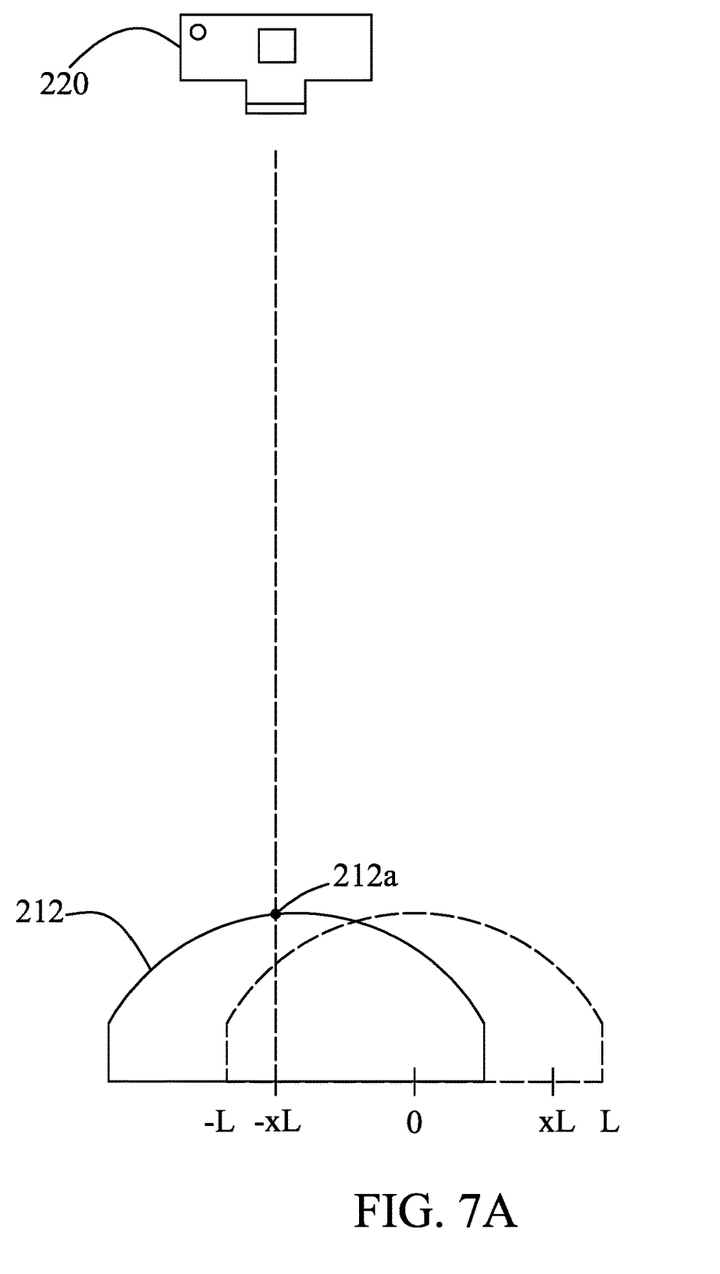
FIG. 7A to FIG. 7D are schematic views illustrating the capture device, the lenticular lens and the subject to be captured in the operation in accordance with another embodiment of the present invention.
Figure 7B:
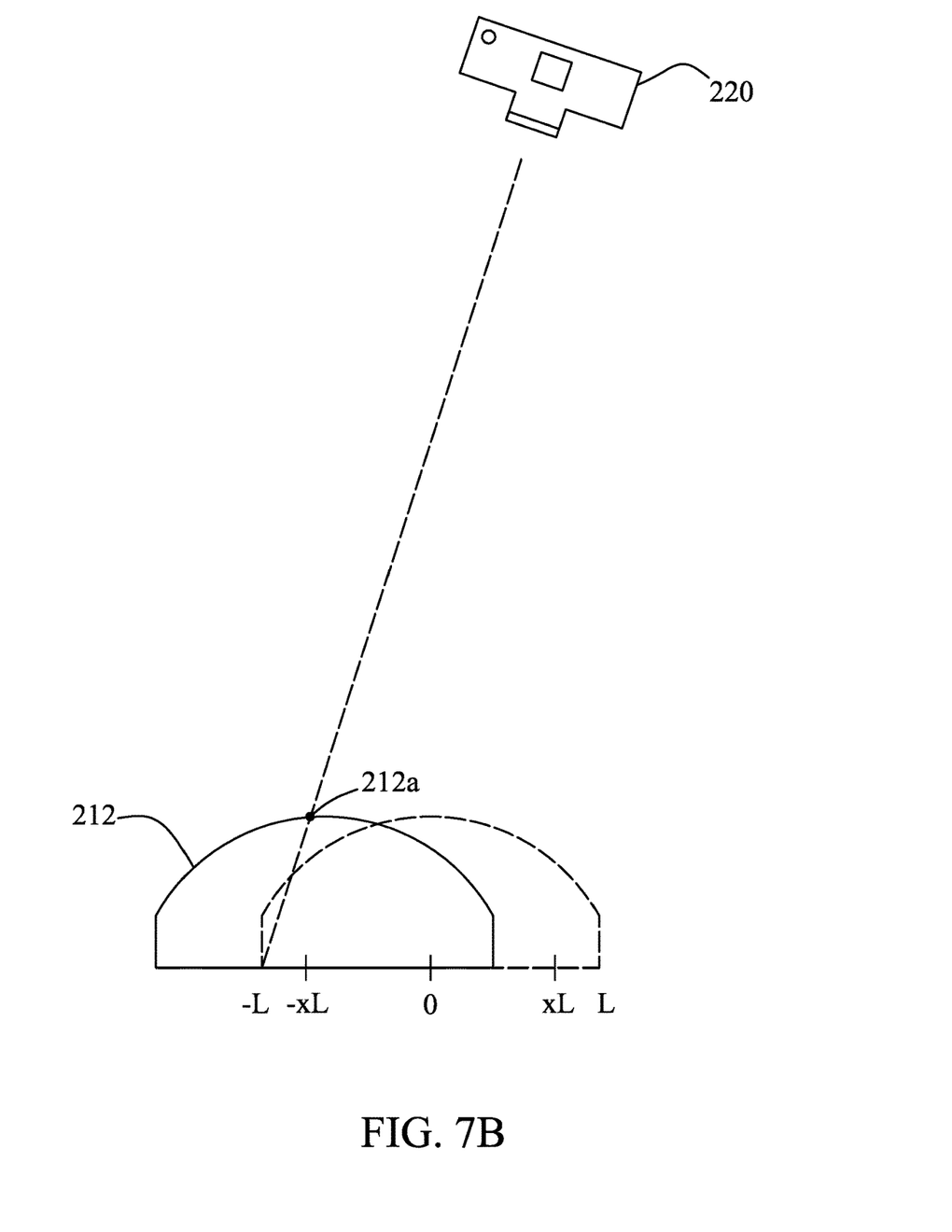
Figure 7C:
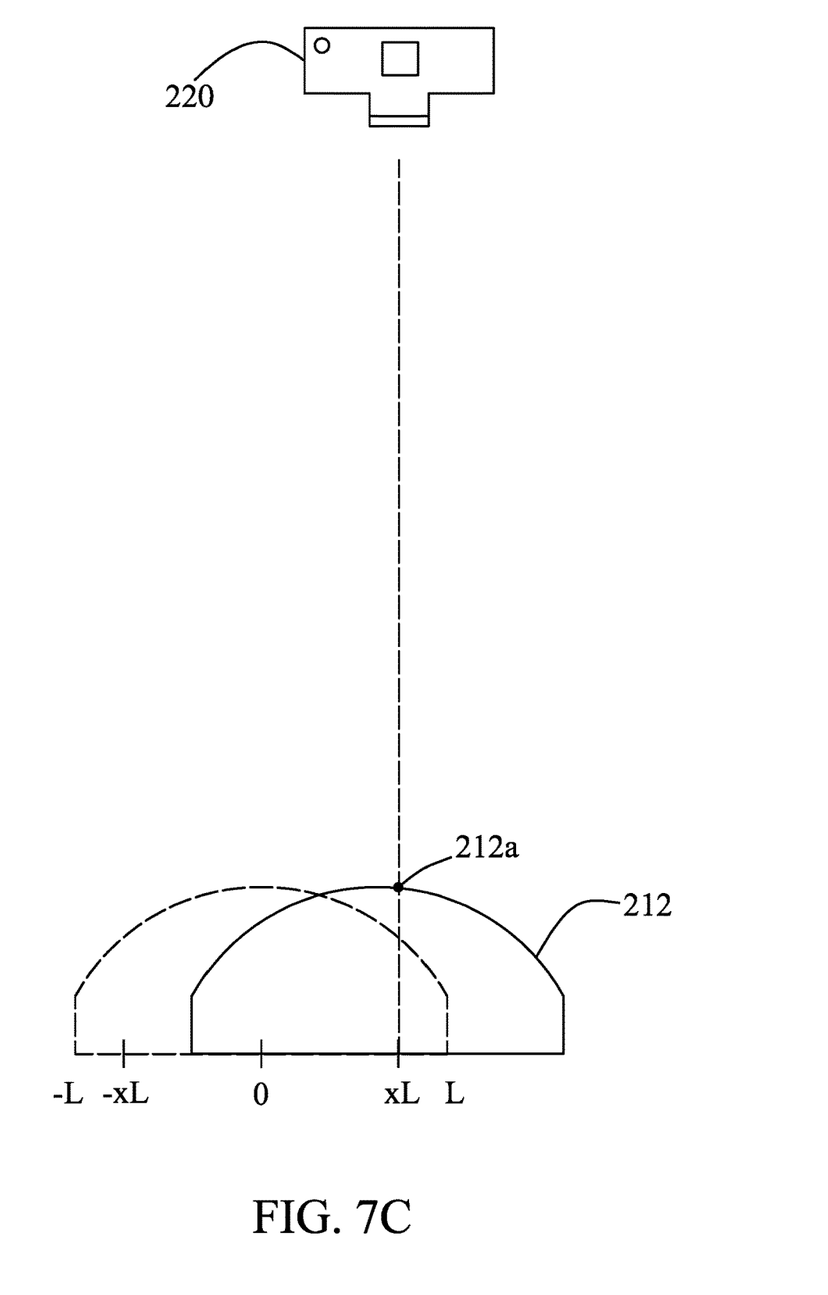
Figure 7D:
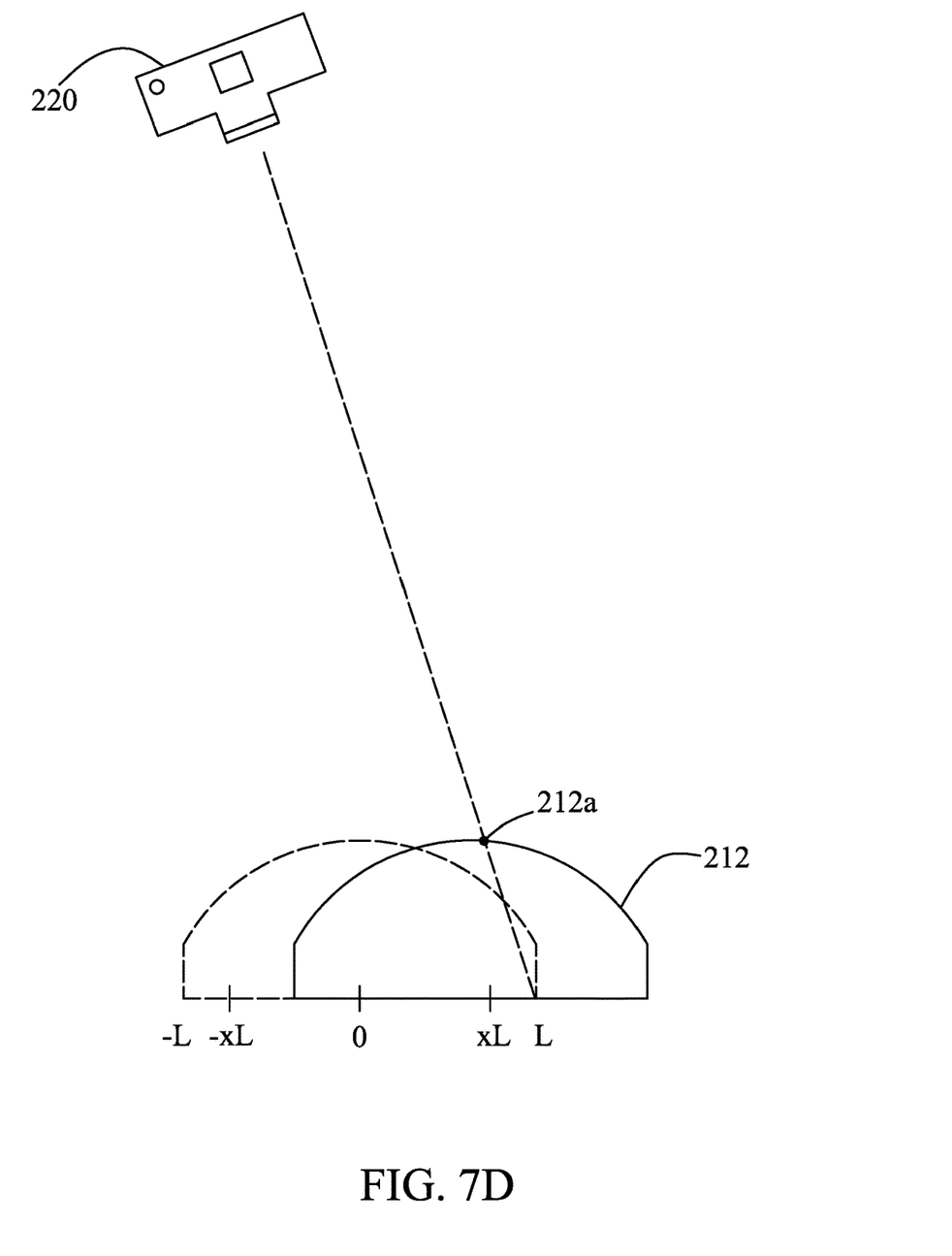

Next, performing Step S640, as shown in FIG. 7A, the capture device 220 is displaced, enabling the capture device 220 to be located right above −xL of the bottom coordinate. Next, performing Step S650, the capture device 220 is laterally moved to capture the subject 30 (as shown in FIG. 2) until the lens of the capture device 220 is aimed at −L of the bottom coordinate of the lenticular lens 212 as shown in FIG. 7B. Afterward, as shown in FIG. 6B, performing Step S660. As shown in FIG. 7C, the capture device 220 is displaced, enabling the capture device 220 to be located right above xL of the bottom coordinate. Then, performing Step S670, the capture device 220 is laterally moved to capture the subject 30 (as shown in FIG. 2) until the lens of the capture device 220 is aimed at L of the bottom coordinate as shown in FIG. 7D.

Afterward, performing Step S680, the capture device 220 is displaced, enabling the lens of the capture device 220 to aim at the top of another lenticular lens, and Steps S620 to S670 are repeated until all the lenticular lenses 212 on the lenticular array 210 (as shown in FIG. 1) has been captured.

It is noted that when capturing the pixels corresponding to the range from −xL to −L and from xL to L the capturing procedure of the capture device 220 is not limited in the procedure as described in the step S640—step S650, just to capture the subject 30 without aimed at the top 212a of the lenticular lens 212.

In the aforesaid method for creating a 3D image, Step S310 to Step S350 and Step S610 to Step 680 are preferably performed by software simulation. That is, the structure and function of each component (the capture device 220 and the lenticular array 210) of the image capture system 200 can be simulated by software. Furthermore, the subject 30 to be captured can be drawn by 3D software, or it can be captured by a 3D camera and then inputted to the software. In this embodiment, the software for performing Step S310 to Step S350 and Step S610 to Step 680 may be Unity, Unreal, OGRE, OpenSceneGraph, and so on.

Figure 5:
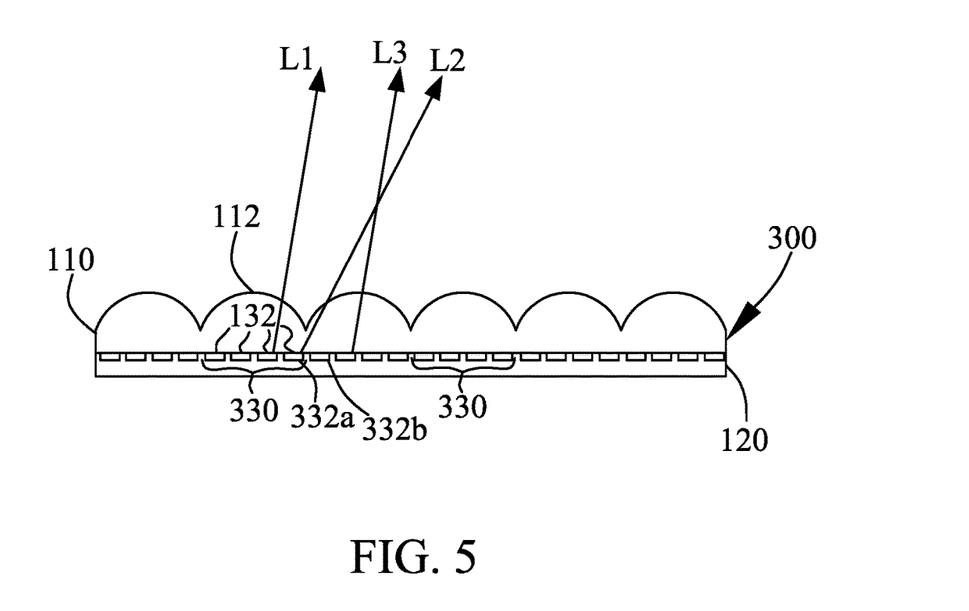
FIG. 5 illustrates an embodiment of the 3D image system of the present invention.

Referring to FIG. 5, FIG. 5 illustrates an embodiment of the 3D image system of the present invention. In FIG. 5, like reference numerals denote like elements as FIG. 1, and thus, descriptions thereof will not be repeated. After Step S310 to Step S350 and Step S610 to Step 680 are performed, the pixel captured by the capture device 220 is outputted to the recorded image media 120 as shown in FIG. 5 to form multiple image line sets 330. In this embodiment, the recorded image media 120 may be a common cupboard. The image line sets 330 are printed on the recorded image media 120. Or, the recorded image media 120 may be an active display device, such as an LCD. The image line sets 330 are displayed on the screen of the LCD. It is noted that as shown in FIG. 5 each image line set 330 has a plurality of image lines 332, but it may have only one image line 332. In addition, the size of the lenticular array 110 is the same as that of the lenticular array 210.

As shown in FIG. 5, the image line 332a emitting the light L2 and the image line 332b emitting the light L3 correspond to the pixel from L to xL and from −L to −xL, respectively. As known from the aforesaid embodiment, the pixel from L to xL and from −L to −xL is specially proceeded. Compared to the image line 132a and the image line 132b, the image line 332a is more similar to the image line 332b. As shown in FIG. 5, when the user takes a view, even though the light L2 and the light L3 are overlapped, there is no or less afterimage occurred because the image line 332a is less similar to the image line 332b compared to the image line 132a and the image line 132b. This solves the problem of afterimage effectively.

Furthermore, in the foregoing embodiment the image capture system 200 includes only one capture device 220, but the image capture system 200 may include a plurality of capture devices 220. For example, the number of the capture devices 220 is identical to the number of the lenticular lenses 212. In this way, Step S310 to Step S350 and Step S610 to Step 680 are performed for all the lenticular lenses 212 simultaneously so as to expedite the processing time.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A method for creating a 3D image, the 3D image displayed in a 3D image system and the 3D image system including a recorded image media, the method comprising the steps of:
   (a) providing a capture device, a subject to be captured, and a lenticular array, wherein the lenticular array comprises a plurality of strip-shaped lenticular lenses, a length of a bottom of each lenticular lens is 2L, and a center of the bottom is set as 0;
   (b) placing the capture device to aim at a top of one of the lenticular lenses and a point between −xL to xL of a bottom coordinate of the lenticular lens, and capturing the subject until a capturing for a plurality of pixels corresponding to the range from −xL to xL, of the bottom coordinate of the lenticular lens is finished, wherein the value of x is smaller than 1 but greater than 0;
   (c) mapping pixels corresponding to the range from from −xL, to 0 and from xL to 0 captured by the capture device to pixels corresponding to a range from −L to −xL and from L to xL of the bottom coordinate;
   (d) repeating the steps (b) to (c) for the others of the lenticular lenses; and
   (e) outputting the pixels captured by the capture device to the recorded image media to form multiple image line sets.

2. The method for creating a 3D image as claimed in claim 1, wherein the value of the x is greater than 0.5.

3. The method for creating a 3D image as claimed in claim 1, wherein the subject to be captured is disposed between the capture device and the lenticular array.

4. The method for creating a 3D image as claimed in claim 1, wherein in the step (b) turning the capture device with the top of the lenticular lens as the center to capture the subject.

5. The method for creating a 3D image as claimed in claim 1, wherein the steps (a) to (d) are performed by software simulation.

6. The method for creating a 3D image as claimed in claim 5, wherein in the step (a) a plurality of capture devices is provided.

7. The method for creating a 3D image as claimed in claim 6, wherein each capture device corresponds to a respective one of the lenticular lenses.

8. The method for creating a 3D image as claimed in claim 1, wherein in the step (c) replacing pixels from −L to −xL and from L to xL, of the bottom coordinate with pixels from −xL to 0 and from xL to 0 captured by the camera.

9. A method for creating a 3D image, the 3D image displayed in a 3D image system and the 3D image system including a recorded image media, the method comprising the steps of:
   (a) providing a capture device, a subject to be captured, and a lenticular array, wherein the lenticular array comprises a plurality of strip-shaped lenticular lenses, a length of a bottom of each lenticular lens is 2L, and a center of the bottom is set as 0;
   (b) placing the capture device to aim at a top of one of the lenticular lenses and a point between −xL and xL of a bottom coordinate of the lenticular lens, and capturing the subject until a capturing for a plurality of pixels corresponding to the range from −xL to xL of the bottom coordinate of the lenticular lens is finished, wherein the value of x is smaller than 1 but greater than 0;
   (c) capturing all pixels corresponding to a range from −L to −xL and from L to xL of the bottom coordinate, during the capturing the capture device is not aimed at the top of the lenticular lenses;

(d) repeating the steps (b) to (c) for the others of the lenticular lenses; and (e) outputting the pixels captured by the capture device to the recorded image media to form multiple image line sets.

10. The method for creating a 3D image as claimed in claim 9, wherein the value of the x is greater than 0.5.

11. The method for creating a 3D image as claimed in claim 10, wherein the subject to be captured is disposed between the capture device and the lenticular array.

12. The method for creating a 3D image as claimed in claim 11, wherein the steps (a) to (d) are performed by software simulation.

13. The method for creating a 3D image as claimed in claim 12, wherein in the step (a) a plurality of capture devices is provided.

14. The method for creating a 3D image as claimed in claim 13, wherein each capture device corresponds to a respective one of the lenticular lenses.

15. The method for creating a 3D image as claimed in claim 9, wherein in the step (c) replacing pixels from −L to −xL and from L to xL of the bottom coordinate with pixels from −xL to 0 and from xL to 0 captured by the camera.

* * * * *